(12) United States Patent
Soklaski

(10) Patent No.: US 9,403,473 B2
(45) Date of Patent: Aug. 2, 2016

(54) SCOOTER LIFT CANOPY

(71) Applicant: Tyrone Soklaski, West Palm Beach, FL (US)

(72) Inventor: Tyrone Soklaski, West Palm Beach, FL (US)

(*) Notice: Subject to any disclaimer, the term of this patent is extended or adjusted under 35 U.S.C. 154(b) by 0 days.

(21) Appl. No.: 14/477,854

(22) Filed: Sep. 4, 2014

(65) Prior Publication Data

US 2015/0061316 A1    Mar. 5, 2015

Related U.S. Application Data

(60) Provisional application No. 61/873,831, filed on Sep. 4, 2013.

(51) Int. Cl.
| | | |
|---|---|---|
| *B60P 7/04* | (2006.01) | |
| *B60P 3/06* | (2006.01) | |
| *B60R 9/06* | (2006.01) | |
| *B60P 3/12* | (2006.01) | |

(52) U.S. Cl.
CPC ... *B60P 7/04* (2013.01); *B60P 3/06* (2013.01); *B60P 3/122* (2013.01); *B60R 9/065* (2013.01)

(58) Field of Classification Search
CPC ............ B60R 9/06; B60R 9/065; B60P 3/06; B60P 7/04; A61G 3/0808; A61G 3/0209; A61G 3/062
USPC .................... 135/88.08; 296/100.14; 414/462
See application file for complete search history.

(56) References Cited

U.S. PATENT DOCUMENTS

| | | | | | |
|---|---|---|---|---|---|
| 4,593,840 | A | * | 6/1986 | Chown | 224/520 |
| 5,199,842 | A | * | 4/1993 | Watt et al. | 414/537 |
| 6,017,081 | A | * | 1/2000 | Colby | 296/173 |
| 6,663,161 | B1 | * | 12/2003 | Tyrer | 296/100.11 |
| 6,802,327 | B2 | * | 10/2004 | Koss | 135/88.08 |
| 7,785,058 | B2 | * | 8/2010 | Ray | 414/462 |
| 8,540,474 | B2 | * | 9/2013 | Egan | 414/462 |
| 2003/0156930 | A1 | * | 8/2003 | Ahedo, Jr. | 414/462 |
| 2007/0280807 | A1 | * | 12/2007 | Threet et al. | 414/462 |
| 2012/0118341 | A1 | * | 5/2012 | Hooper et al. | 135/88.05 |
| 2015/0086311 | A1 | * | 3/2015 | Egan | 414/462 |

* cited by examiner

*Primary Examiner* — Noah Chandler Hawk
(74) *Attorney, Agent, or Firm* — Allen F. Bennett; Bennett Intellectual Property

(57) ABSTRACT

A canopy for a scooter lift may be used to protect items placed upon a lift at the rear of a car from the environment. The canopy may be retrofitted to an existing lift or may be an integral part of a lift. The canopy is supported by a frame and a series of ribs that fold out and an accordion type fashion. A zipper may be used to hold the canopy and a retracted position. Hooks may be included to attached the unfurled, open canopy to the platform of a lift.

2 Claims, 6 Drawing Sheets

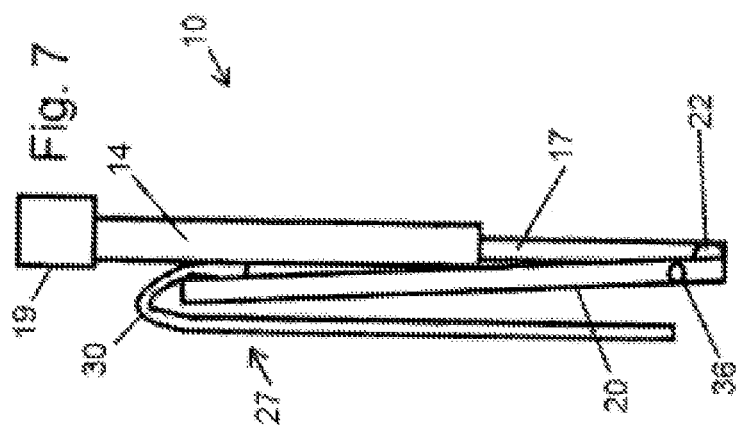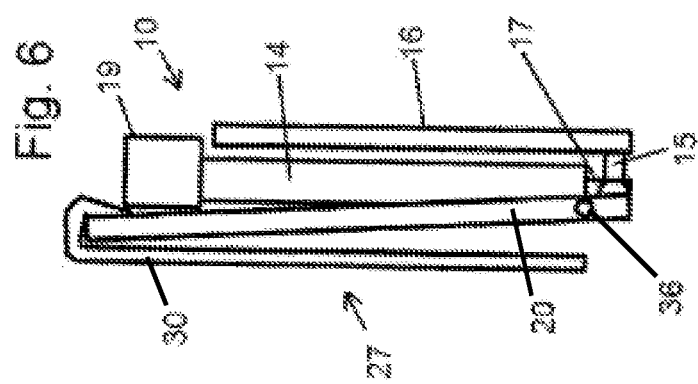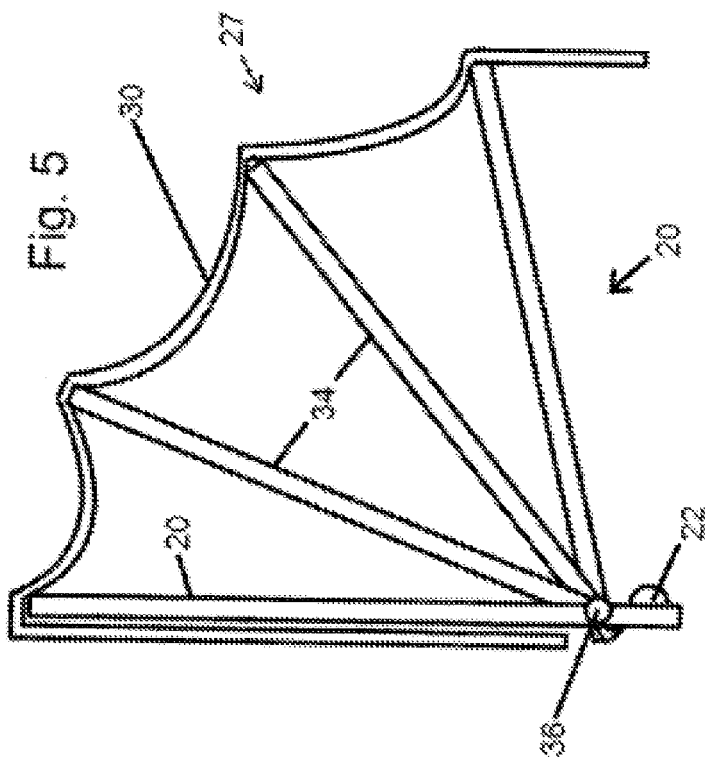

SCOOTER LIFT CANOPY

CROSS-REFERENCE TO RELATED APPLICATIONS

This application claims priority to U.S. Provisional Application Ser. No. 61/873,831 filed on Sep. 4, 2013, the contents of which are hereby incorporated in their entirety.

BACKGROUND OF THE INVENTION

1. Field of Endeavor

The present invention relates to an apparatus and systems for a scooter lift canopy. More particularly, the invention relates to a device for covering a scooter, wheelchair or the like when positioned on a lift attached to the rear of an automobile.

2. Background Information

It has become increasingly common for people with limited mobility to transport with them, a scooter, wheelchair, walker or similar device. For convenience, the scooter or other object is attached to a lift, which may be affixed to the rear of an automobile. Once attached to the lift, the lift raises the scooter off the ground and hold it securely during transportation. However, because the scooter is outside the automobile. It is exposed to the elements. As a result, it may become wet or may be damaged by debris. In addition, extensive exposure to sunlight, and the elements causes undue wear upon the device.

In view of the foregoing, there is a need to provide additional protection to a scooter located on a lift on the rear of a vehicle. It is therefore desirable to provide a secure and effective means of covering and protecting a scooter during transportation.

BRIEF SUMMARY OF THE INVENTION

Accordingly, the primary object of the present invention is to provide an apparatus and system for covering and protecting a scooter attached to a lift at the rear of the vehicle.

In greater detail, a canopy may include a frame connecting bars and connecting plates, and a plurality of ribs all rotatable about a pivot point. The pivot point are at the base of the frame and the plurality of U-shaped ribs rotate about them. The material of which the canopy is composed is attached to the ribs and folds out over the lift and lift platform. In this manner, it covers any object on the lift. Hooks or other devices may be used to attach the opened canopy to the platform to hold it in place. While it is open.

It is therefore an object of the present invention to provide a canopy for covering items placed on a scooter lift.

These and other objects and advantages of the present invention will become apparent from a reading of the attached specification and appended claims. There has thus been outlined, rather broadly, the more important features of the invention in order that the detailed description thereof that follows may be better understood, and in order that the present contribution to the art may be better appreciated. There are features of the invention that will be described hereinafter and which will form the subject matter of the claims appended hereto.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein:

FIG. 5 is a side view of a scooter lift canopy in accordance with the principles of the invention;

FIG. 6 is a side view of a scooter lift canopy attached to a scooter lift in the up position in accordance with the principles of the invention;

FIG. 7 is a side view of a scooter lift canopy attached to a scooter lift in the down position in accordance with the principles of the invention;

DETAILED DESCRIPTION

Figure 2:
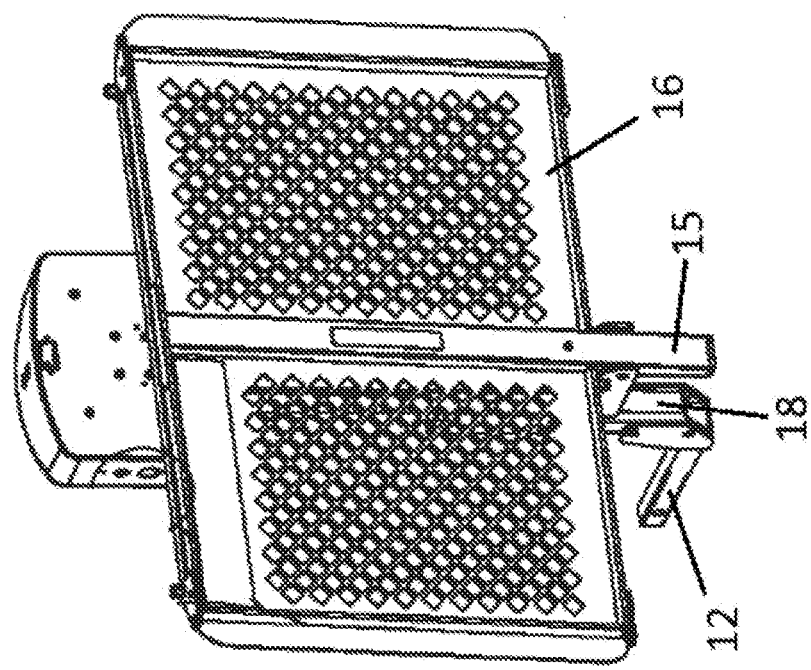
FIG. 2 is a perspective view of a scooter lift of the prior art.

Before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

Disclosed is a retractable canopy that may fold in an accordion style fashion when not in use. The canopy, as explained herein may generally be described as a canopy or cover for a scooter, wheelchair or similar object on a lift located externally of and attached to a vehicle such as a car, bus, truck or van. However, it may also cover other objects. The canopy may be attached to a frame which may be built integrally with a lift or may be retrofitted onto existing lifts. For convenience and simplicity, the invention is often referred to herein in relation to a scooter lift. However, this term refers generally to a scooter lift, a wheelchair lift or to any lift fitted externally to an object such as a vehicle. The vehicle may be a car, truck, van, bus, or even a boat, helicopter or any device for transportation.

Figure 1:
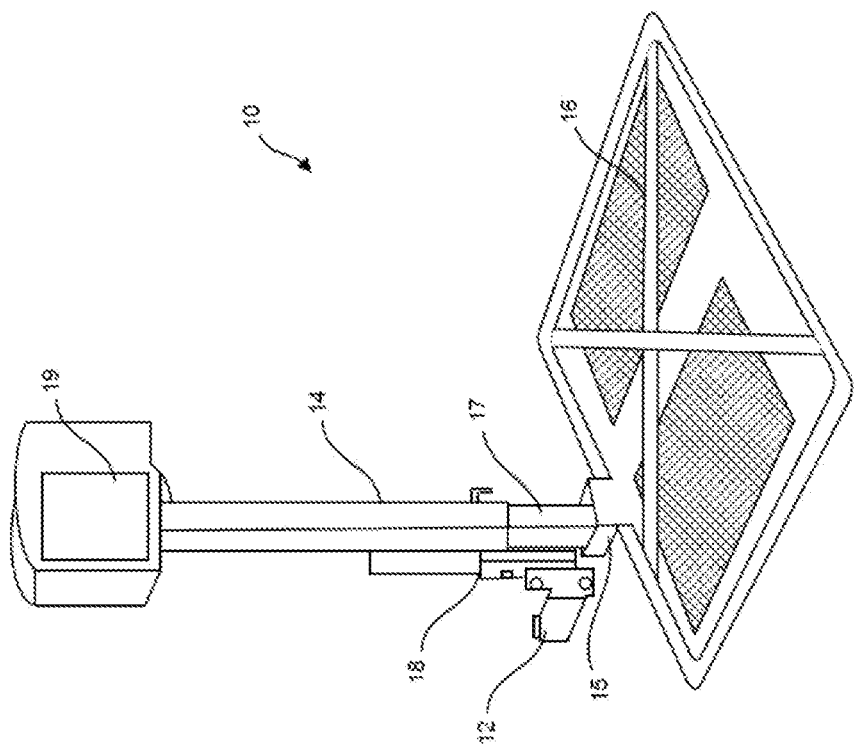
FIG. 1 is a perspective view of a scooter lift of the prior art.

FIGS. 1 and 2 show a scooter lift 10 of the prior art. The lift 10 may include a hitch mount 12 for removable attachment to a trailer hitch receiver on an automobile. The hitch mount 12 may be designed for compatibility with any particular trailer hitch receiver that may suitably support wheelchair lift 10. The hitch mount 12 may be in secured and/or adjustably connected to a bracket 18. The bracket 18 is connected to an elongate body 14. An elevator arm 17 may extend downward from the body 14 and may telescope into and out of the body 14 in order to increase and decrease the distance of base 15 and platform 16 from the ground.

To place a scooter or wheelchair on the platform 16, the platform may be lowered to the ground by extending elevator arm 17 out of the body 14 until the platform 16 is flush with the ground. Once the device is secured to the platform 16, the elevator arm 17 may be retracted such that the platform 16 is elevated to a position sufficiently high for safe transport. When the vehicle arrives at its destination, the platform 16 may be lowered by extending the elevator arm 17 until the platform 16 is flush with the ground. The raising and lowering of the elevator arm 17 may be controlled by manipulating various knobs, buttons, levers and the like on the control box 19.

The platform 16 may be pivotally connected to the base 15. Platform 16 may be pivoted through about 90° from a horizontal position perpendicular to the body 14 as shown in FIG. 1 to a vertical position as shown in FIG. 2 parallel to the body 14. The platform 16 may be locked into each of these positions by any method known in the art.

Figure 3:
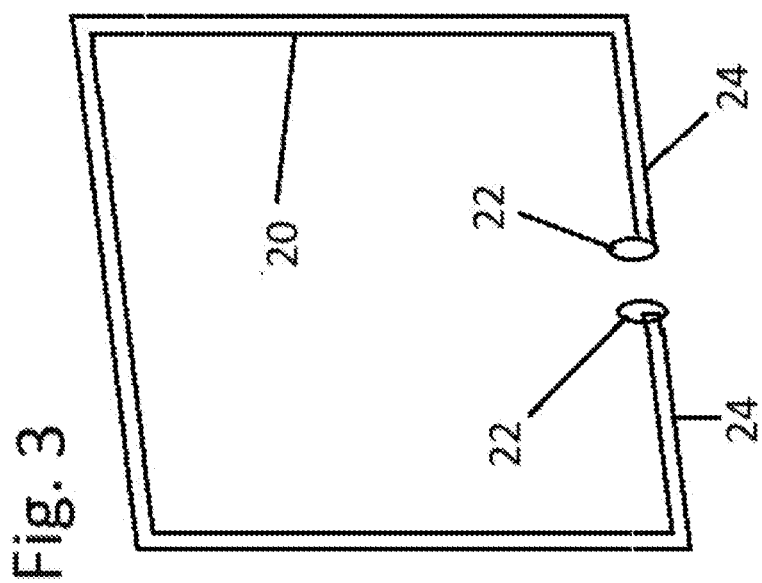
FIG. 3 is a perspective view of a scooter lift canopy frame in accordance with the principles of the invention.

FIG. 3 shows a canopy frame 20 that includes a beam 21, two lateral rods 20 and two support arms 24. The support arms 24 each extend from the lateral rods 20 and have a mounting point 22. In this embodiment, the mounting points are round or elliptical plates having holes for accommodating the use of nuts and bolts to attach the mounting points to an elevator arm of a scooter lift.

Figure 4:
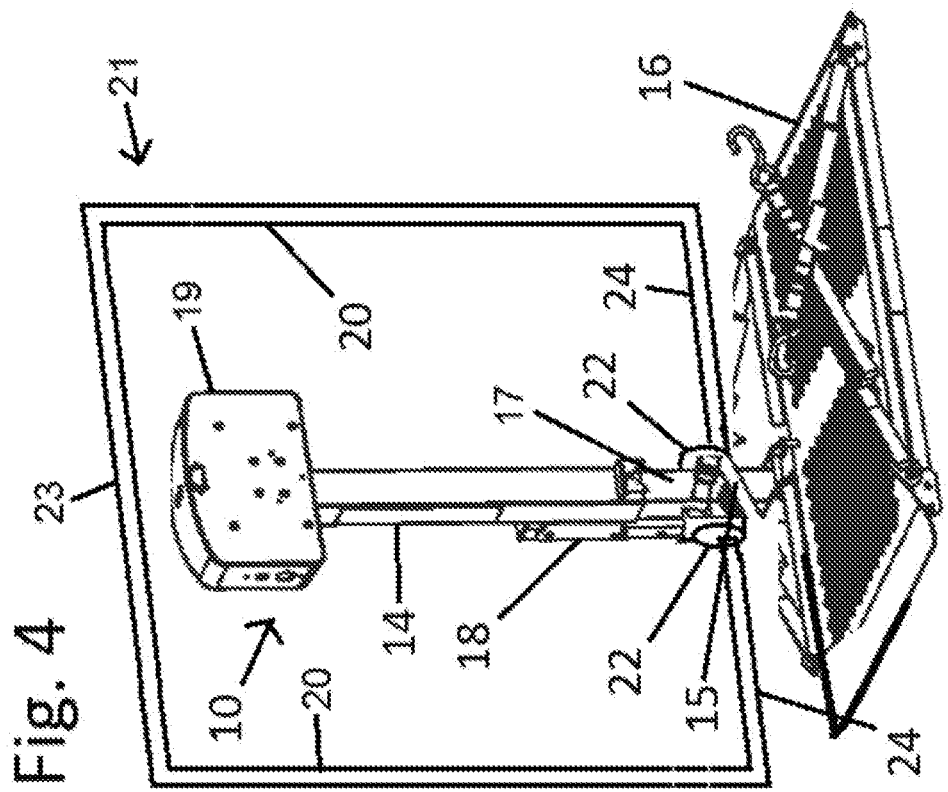
FIG. 4 is a perspective view of a canopy frame attached to a scooter lift in accordance with the principles of the invention.

FIG. 4 shows the frame 21 of FIG. 3 attached to the scooter lift 10 of FIGS. 1 and 2. The mounting points 22 may be attached to the base 15, to the body 14 or to the elevator arm 17. Optionally, it may be desirable to attach the frame to the bracket 18. This may allow the frame 22 to be secured to the lift 10 without getting in the way of or interfering with the other components of the lift 10.

FIG. 5 shows a canopy frame 21 with three folding arms 34 attached at a pivot point 36 located on the lateral rod 20. The folding arms 34 may pivot or rotate about the pivot point 36 such that they may fold out. A sheet 30 may be attached to the frame and the folding arms 34. The folding arms 34 may be extended from the frame 20 in an accordion style, similar to some awnings. Together, the canopy frame 20, the folding arms 34, pivot point 36, and sheet 30, may form a scooter lift canopy 27 in accordance with the principles of the invention. When the canopy 27 is mounted on a scooter lift, the folding arms may be extended such that an object resting upon the platform 16 will be covered by the canopy sheet 30.

FIGS. 6 and 7 show a scooter lift canopy 27 attached to an elevator arm 17 of a scooter lift 10. The mounting points 22, here comprising plates that may facilitate attachment to the elevator arm 17 by means of nuts and bolts, screws, rivets, lynch pins or the like. Optionally, the mounting points 22 may be configured to attach by other mechanisms known in the art. The mounting points may preferably be secured such that the frame 21 is held in place stationary. FIG. 6 shows the lift 10 having the platform 16 in the up position. Here, the top of the frame 21 and beam 23 are above the control box 19 and the folding arms may be easily unfolded and the canopy may be extended.

FIG. 7 shows the lift 10 in the down position with the platform lowered. In this configuration, the canopy may not be opened because the body 14 and control box 19 of the lift 10 hold the canopy in the closed position. This may be advantageous and simplify loading of a scooter or other device on the lift 10.

Figure 8:
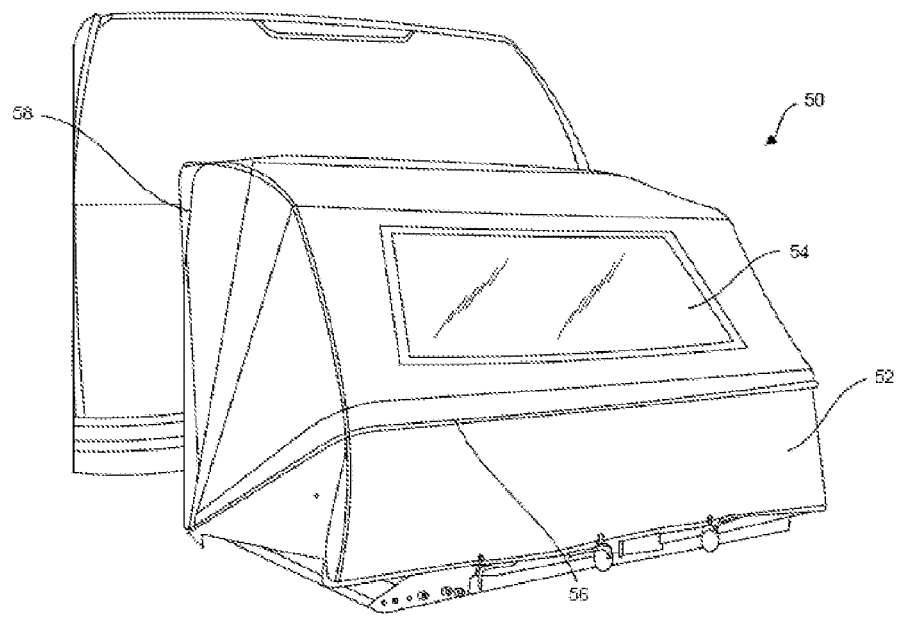
FIG. 8 is an environmental view of an alternative embodiment of a scooter lift canopy in accordance with the principles of the invention.

FIG. 8 shows an alternative embodiment of a scooter lift canopy 50 in accordance with the principles of the invention. The canopy 50 includes a canopy sheet 52 having a window 54. Zipper components 56 and 58 may also be seen. Inclusion of these zipper components may facilitate folding the canopy 50 and holding in the closed position.

Figure 9:
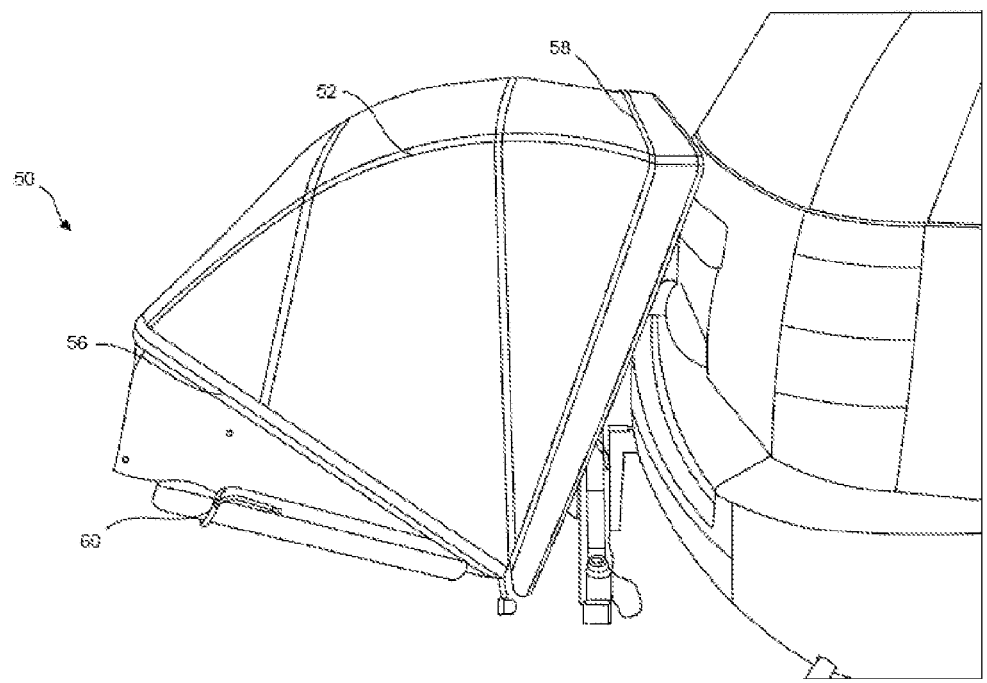
FIG. 9 is a side environmental view of an alternative embodiment of a scooter lift canopy in accordance with the principles of the invention.

FIG. 9 show the scooter lift canopy 50 from a different perspective. Zipper component 58 may be seen to extend across the length of the canopy 52. A bungee cord 60 may be used to hold the canopy sheet 52 securely to a platform of a scooter lift and prevent it from flying up during transport.

Figure 10:
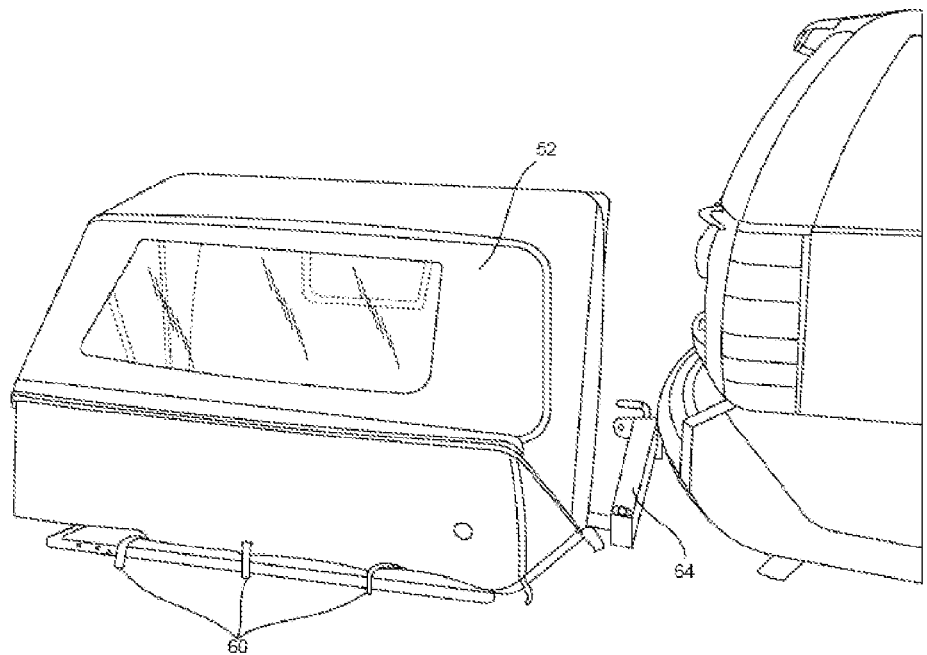
FIG. 10 is an environmental view of an alternative embodiment of a scooter lift canopy in accordance with the principles of the invention.
Figure 11:
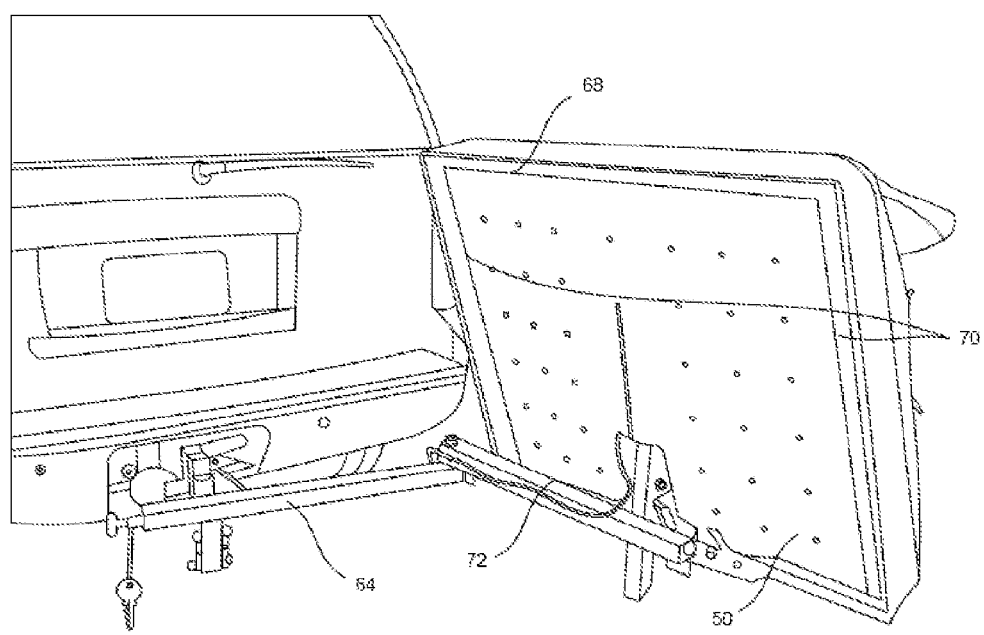
FIG. 11 is an environmental view of an alternative embodiment of a scooter lift canopy in accordance with the principles of the invention.
Figure 12:
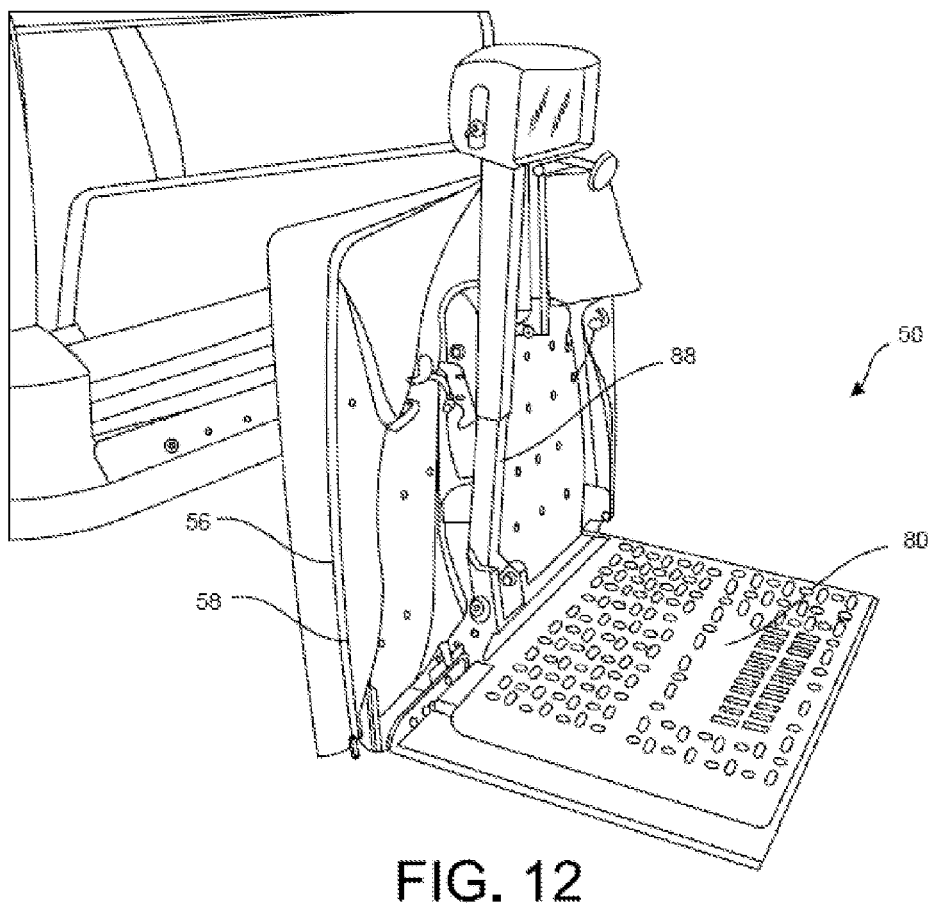
FIG. 12 is an environmental view of an alternative embodiment of a scooter lift canopy in accordance with the principles of the invention.

FIG. 10 shows the canopy 50 on the swing arm 64 of an SUV. Bungees cords 60 hold the sheet 52 down securely. FIG. 11 shows the beam 68, lateral arms 70 and support arms 72 of the alternative embodiment of the canopy 60. FIG. 12 shows the canopy 50 zipped together at zip components 56 and 58. The body 80 and platform 88 of the scooter lift may be seen.

Whereas, the present invention has been described in relation to the drawings attached hereto, it should be understood that other and further modifications, apart from those shown or suggested herein, may be made within the spirit and scope of this invention. Descriptions of the embodiments shown in the drawings should not be construed as limiting or defining the ordinary and plain meanings of the terms of the claims unless such is explicitly indicated.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

The invention claimed is:

1. A scooter lift comprising:
   a scooter lift having an elongate body having a top and a bottom, a control box located at the top of the body, an elevator arm and a base at the bottom of the elevator arm, wherein the scooter lift has a lowered configuration when the elevator arm is extended downward such that the base lies flush with the ground, and has a raised configuration when the elevator arm retracts into the body and lifts the base above the ground;
   a rectangular frame having an upper beam, two lateral rods, each lateral rod having a support arm extending from it, wherein each support arm is mounted to the bottom of the elevator arm, wherein the frame is lowered when the elevator arm is in the lowered configuration and the frame is lifted when the elevator arm is in the raised configuration;
   at least one pivot point on each of the lateral rods;
   one or more folding arms rotatably attached to the pivot points; and,
   a sheet extending over the frame and the folding arms;
   wherein the folding arms may be extended outward such that the sheet covers the scooter lift and may be folded into a position substantially parallel to the lateral rods; and,
   wherein the folding arms may only be extended when the scooter lift is in the raised configuration, and the folding arms are held substantially parallel to the lateral rods by the body when the scooter lift is in the lowered configuration.

2. The canopy of claim 1 wherein the folding arms are secured by a zipper when they are folded into a position substantially parallel to the lateral rods.

* * * * *